US012681485B2

(12) United States Patent
Davis

(10) Patent No.: US 12,681,485 B2
(45) Date of Patent: Jul. 14, 2026

(54) DRONE FLIGHT CONTROL CENTER AND PILOT MONITOR

(71) Applicant: Irl Michael Davis, Tygh Valley, OR (US)

(72) Inventor: Irl Michael Davis, Tygh Valley, OR (US)

( * ) Notice: Subject to any disclaimer, the term of this patent is extended or adjusted under 35 U.S.C. 154(b) by 65 days.

(21) Appl. No.: 18/804,342

(22) Filed: Aug. 14, 2024

(65) Prior Publication Data

US 2025/0164998 A1 May 22, 2025

Related U.S. Application Data

(60) Provisional application No. 63/519,395, filed on Aug. 14, 2023.

(51) Int. Cl.
*G05D 1/224* (2024.01)
*G05D 1/223* (2024.01)
*G05D 109/25* (2024.01)

(52) U.S. Cl.
CPC ........... *G05D 1/2248* (2024.01); *G05D 1/223* (2024.01); *G05D 2109/254* (2024.01)

(58) Field of Classification Search
CPC ................. G05D 1/2248; G05D 1/223; G05D 2109/254; G05D 1/617; G05D 1/2247; B64F 1/00; G06V 10/764; G06V 20/17
See application file for complete search history.

(56) References Cited

U.S. PATENT DOCUMENTS

| | | | | |
|---|---|---|---|---|
| 10,322,728 B1 * | 6/2019 | Porikli | ................... | G06V 10/80 |
| 2002/0036568 A1 * | 3/2002 | Bredow | ............... | G05B 19/042 |
| | | | | 340/573.1 |
| 2016/0370800 A1 * | 12/2016 | Chau | .................... | G05D 1/0022 |
| 2017/0069214 A1 * | 3/2017 | Dupray | .................... | G08G 5/56 |
| 2017/0235308 A1 * | 8/2017 | Gordon | ............... | G05D 1/0094 |
| | | | | 701/2 |
| 2018/0312253 A1 * | 11/2018 | Zhao | ...................... | G05D 1/106 |
| 2019/0095687 A1 * | 3/2019 | Shaw | ................... | A61B 5/1171 |
| 2020/0057487 A1 * | 2/2020 | Sicconi | ................... | G06F 3/011 |

* cited by examiner

*Primary Examiner* — Abby Lin
*Assistant Examiner* — Danielle M Jackson
(74) *Attorney, Agent, or Firm* — Miller Nash LLP

(57) ABSTRACT

An sUAS operations device that allows a pilot to fly an sUAS. The device includes a sensor interface to receive signals from a sensor attached to the pilot to monitor physiological responses of the pilot during the flight. The system records a video of the flight and synchronizes it with the sensor feedback to allow correlation of the stress levels with the flight. The system also may provide feedback to the pilot during flight.

13 Claims, 3 Drawing Sheets

10

16

20

22

18

14

12

24

DRONE FLIGHT CONTROL CENTER AND PILOT MONITOR

CROSS-REFERENCE TO RELATED APPLICATIONS

This disclosure is a non-provisional of and claims benefit from U.S. Provisional Application No. 63/519,395, titled "DRONE FLIGHT CONTROL CENTER AND PILOT MONITOR," filed on Aug. 14, 2023, the disclosure of which is incorporated herein by reference in its entirety.

TECHNICAL FIELD

This disclosure relates to flight control modules and pilot monitoring systems.

BACKGROUND

Drones, also referred to as unmanned aerial vehicles (UAV), or unmanned aircraft, also referred to as small Uncrewed Aircraft Systems (sUAS), typically have an operator or pilot, a person who operates a controller that in turn controls the drone. While some UAVs are autonomous, most use pilots.

UAV incidents and accidents are increasing following the rise in use of small uncrewed aircraft systems. sUAS Flight training has limited hands on training related to stress. Unlike conventional flight training, sUAS training does not include consistent emergency (actual) instruction. Most Remote Pilots are just taking a knowledge exam (FAA requirements under FAR Part 107) and then entering the commercial markets.

NASA is the primary agency that engages in the UAV Safety Reporting system. Review their reports during most incidents, and accidents, are related to human factors. This can be further analyzed by separating human mistakes from equipment malfunctions. Both, however, are directly related to pilot stress, such as more workload meaning higher stress. Similarly, equipment malfunctions lead to higher stress.

Current systems have limited stress management and do no active monitoring of the pilot's stress levels in practical applications. Effective stress training requires immediate feedback with any situation the operator/pilot faces.

DETAILED DESCRIPTION OF THE EMBODIMENTS

The embodiments here attached sensor(s) to a drone or other unmanned aerial vehicle (UAV) pilot. As used here, the term UAV includes UAVs, small UAVs (sUAV) and small Uncrewed Aircraft Systems, (sUAS) and any other kind of piloted drone. One embodiment involves a UAV pilot monitoring system, and the system includes the UAV, a ground control station (GCS), one or more sensors, and one or more video cameras.

Examples of sensors include a heart rate monitor, including heart rate variability monitor (HRV), galvanic skin response sensors, electroencephalogram (EEG) electrodes, etc. The resulting sensor tracking provides the pilot and other systems with feedback as to pilot's stress. The sensors are in physical contact with the pilot. The physical contact may result from the sensors being attached to the pilot, or the pilot touching the sensors, such as when the pilot handles the GCS, as examples without limitation. The sensors send signals related to the pilot's physical condition, such as their heart rhythm and heart rhythm coherence, the pilot's galvanic skin response, EEGs, etc.

The video cameras produce one or more video feeds to be displayed by one or more displays on the GCS. The one or more video feeds may include a video feed from the UAV showing a view that the UAV "sees," a video feed of the pilot's view, obtained from a video camera located near the pilot's eyes, and a video feed of the pilot, more than likely obtained from a camera located at or near the GCS.

Figure 1:
FIG. 1 shows an embodiment of a system to monitor a pilot of an unmanned aerial vehicle (UAV).
Figure 1:
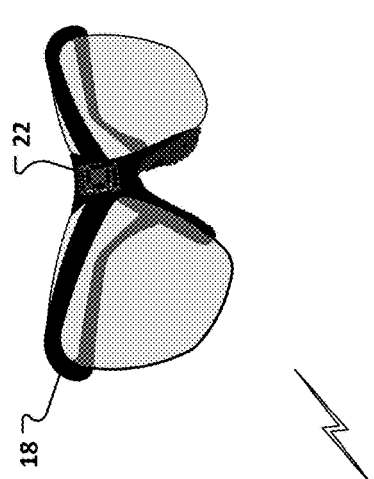
Figure 1:
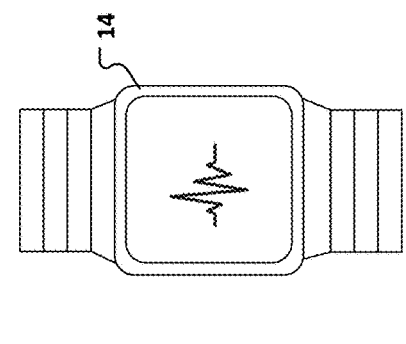
Figure 1:
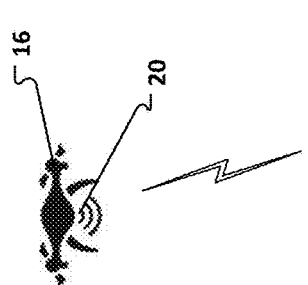
Figure 1:
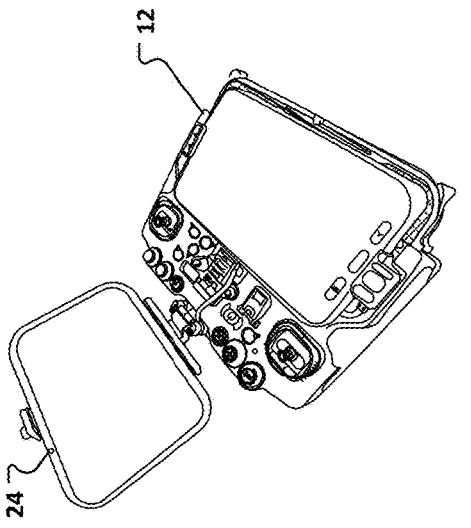

FIG. 1 shows an embodiment of a UAV pilot monitoring system 10 that integrates these components. The pilot training may include both simulator training and field training. Generally, flight operations outside the training environment would not involve this type of monitoring, but one could deploy this type of system in operational environments. One should note that the embodiment of FIG. 1 includes specific components as part of the system, but no limitation to any particular component is intended nor should be inferred.

The pilot monitoring system embodiment of FIG. 1 includes

FIG. 1 shows an embodiment of a pilot monitoring system 10. The system includes a GCS 12, a sensor 14 that is in physical contact with a pilot, and a UAV 16. The system also includes one or more cameras. The embodiment here shows three cameras. A first camera 20 resides in the UAV 16, and a second camera 22 may reside in a position near the pilot's eyes. In the system of FIG. 1, the camera is attached to a pair of safety glasses 18. This comprises an example of where the camera could reside, it may reside on a helmet, a hat, a strap, or other attachment to position the camera. This camera may also be optional. A third camera 24 may reside in the GCS itself to record the facial expressions of the pilot. This camera may also be optional.

Figure 2:
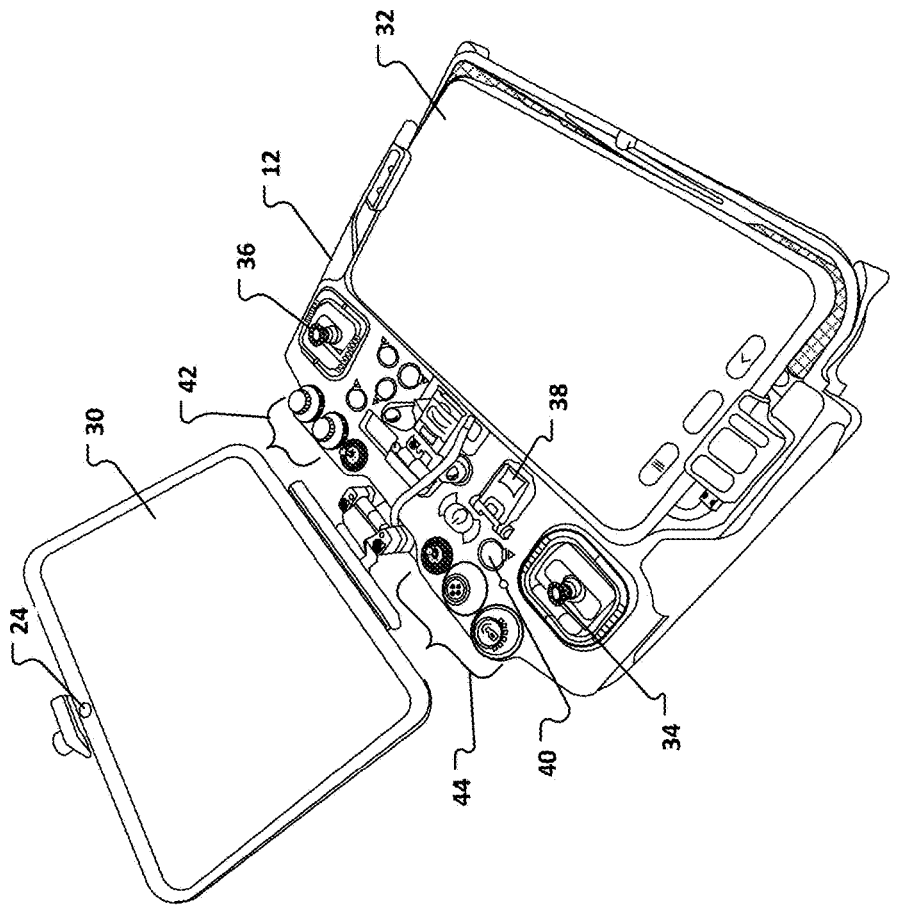
FIG. 2 shows an embodiment of a ground control station.

FIG. 2 shows a closer view of the GCS 12. The GCS has a display 30. In some embodiments, sometimes referred to as a "mobile" GCS, the display 30 may comprise the only display. The location of the second display 32 would merely comprise a framework where the first display would fit when not in use. A "full" GCS embodiment may include two displays, the first display 30 and a second display 32. In addition, the GCS will generally contain primary flight controls. In the embodiment of FIG. 2, the primary flight controls comprise joysticks 34 and 36. The discussion here refers to these as primary flight controls as the pilot will control the UAV with the joysticks. Other flight controls may exist in the regions 42 and 44 of the GCS. The GCS will also include a kill switch 38 that immediately terminates the flight and a power switch 40.

The GCS of these embodiments shows a self-contained GCS. One should note that this may comprise the most useful embodiment, as it does not rely upon a separate computing device. The GCS receives the signals from the sensor(s) and the one or more video feeds and applies an artificial intelligence (AI) machine learning model to the inputs. The GCS may synchronize the different video feeds and the signals using time stamps of their reception. The AI model will analyze the signals and video feeds to determine the likelihood of an incident related to the pilot performance and stress. The AI model may take many forms, including convolutional neural network (CNN), long short-term memory (LSTM) networks, radial basis functions (RBF) neural network, artificial neural network (ANN), recurrent neural network (RNN), as examples.

Prior to deployment in a training environment, the AI model will undergo training. The training may rely upon stored data sets comprised of the signals and video feeds associated with pilot-related incidents. These data sets may be collected over time during training simulations or actual training operations. The feeds before the incident and the resulting incident can train the model to recognize characteristics of the feeds that preceded the accidents. As the model undergoes training, it develops a capacity to view new video and sensor feeds and make predictions as to the possibility of a pilot incident.

When deployed, the system will take the signals and the video feeds and makes predictions of a possibility of an imminent incident. As the GCS evaluates the feeds and signals, the prediction may change. The GCS would then provide an indicator to the pilot. For example, the display may have a region in which a bar or a series of lights could provide instant feedback to the pilot. For example, as the AI model evaluates the inputs and finds no risk, it may display a green light on the display or as a separate LED or other light. If the probability of an incident increases, the light could turn yellow to give the pilot a chance to adjust and adapt their behavior to correct whatever issues are causing the risk. When the light turns red, the system could automatically shut down, or would send the pilot a message that the pilot needs to stop.

The GCS has an architecture somewhat similar to a computing device, except that it has connections or ports that allow the GCS to communicate with the UAV and the sensors and/or cameras that reside on the user. As mentioned above, the GCS will receive signals from the sensor(s) and one or more video feeds. The video feeds will include the video from the drone, and possibly a video feed of the user from a camera mounted on or near the GCS, and possibly a video feed from a camera mounted near the pilot's eyes.

Figure 3:
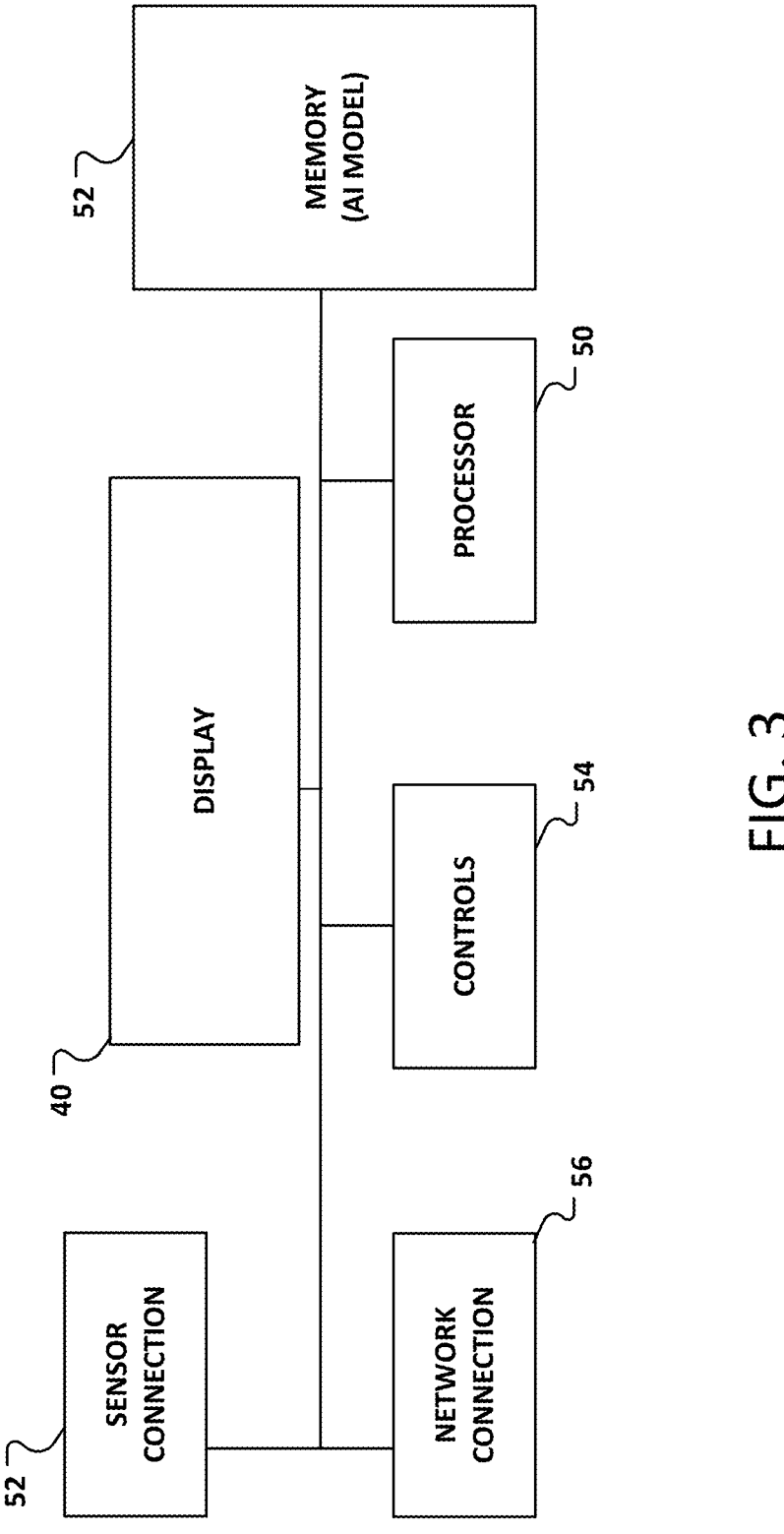
FIG. 3 shows an embodiment of a circuit diagram of a ground control station with a pilot feedback system.

FIG. 3 shows an embodiment of the internal components of the GCS. One should note that the structure may include more components, such as integrated circuits, digital signal processors, analog-to-digital converters, digital-to-analog converters, amplifiers, etc., which would be included in most electronic systems. In addition to the hardware components, the GCS hardware components may include drivers, scripts, control commands, and other software components that allow the GCS to operate. The lack of discussion of these components does not mean that these components do not exist, just that they are not pertinent to the aspects of the GCS that have relevance to the GCS functions.

In FIG. 3, the GCS has display 40, and has connections to the sensor(s) at 52 and a network connection 56. Typically, the network connection will be a wireless network connection, such as for Wi-Fi, Bluetooth®, other near-field communications network, or a wired connection. While the mobility of the GCS would improve with a wireless connection to all of the components, a wired connection may increase the speed to provide faster inputs. The connections may also be mixed. For example, the connection to the drone may be wireless, and the connections to the sensors may be wired. The control inputs may be handled by one or more input devices at 54. Processor 50 represents one or more processors that are configured to execute code that causes the one or more processors to receive signals from the sensors and the video feeds. The code may reside in memory 52, which may also contain the code that causes the one or more processors to operate the AI model. Operating the model causes the one or more processors to execute code that comprises the model and produces the prediction of the likelihood of an incident.

Utilizing this unit and the training will reduce incidents and accidents related to human factors. Increasing training for the remote pilot to handle emergencies, either in simulations or actual flights, will reduce these accidents. Presently, this system and methodology remains the only known system that performs these tasks and analysis.

With the GCS embodiments above, many different training and evaluation scenarios become available. As mentioned above, recording and storing the information provides data sets for training, and can also be reviewed offline. This allows instructors or other evaluators to evaluate the pilot's performance and the flight, regardless of whether the pilot is flying a simulation or in real-time, at a facility or out in the field.

In this manner, a training system allows a pilot and the system to track and monitor their stress levels during flights and provides real-time or near real-time feedback to allow the pilot to adjust. The embodiments focus on development of a unit that can be a critical part of emergency training. According to NASA data, 80% of Drone incidents occur due to Stress related issues with the Pilot.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

The invention claimed is:

1. A ground control station for an unmanned aerial vehicle (UAV), comprising:
   controls to allow a pilot to control flight of a UAV;
   a display to allow the pilot to view at least one of a video feed of the UAV and a video feed from the UAV;
   one or more ports to allow the station to receive signals from one or more sensors connected to the pilot and one or more video feeds;
   a memory to store the one or more video feeds and signals received through the one or more ports; and
   one or more processors configured to execute code that causes the one more processors to:
      apply artificial intelligence to the signals and the one or more video feeds to provide a pilot stress-related incident prediction; and
      notify the pilot if the incident prediction is above a threshold indicating a likelihood of an occurrence of a pilot stress-related incident.

2. The ground control station as claimed in claim 1, wherein the one or more processors are further configured to execute code to store at least one of the signals from the one or more sensors and the one or more video feeds.

3. The ground control station as claimed in claim 1, wherein the one or more sensors comprise a wrist-mounted sensor, or a sensor positioned on the ground control station positioned to contact at least one hand of the pilot.

4. The ground control station as claimed in claim 1, wherein the one or more video feeds comprise one or more of a video feed from the UAV, a video feed of a view of the pilot, and a video feed of the pilot.

5. The ground control station as claimed in claim 1, wherein the one or more processors are further configured to execute code that causes the one or more processors to train the artificial intelligence.

6. The ground control station as claimed in claim 5, wherein the code that causes the one or more processors to train the artificial intelligence comprises code that causes the one or more processors to train the artificial intelligence on one or more dataset comprised of signals, video feeds, and results.

7. A ground control system, comprising:

one or more sensors configured to be in contact with a pilot;

controls to allow a pilot to control flight of a UAV;

one or more cameras, at least one camera attached to the UAV;

a display to allow the pilot to view at least one of a graphic of the UAV and video from the UAV;

one or more ports to allow the system to receive signals from the one or more sensors connected to the pilot and one or more video feeds;

a memory to store the one or more video feeds and signals received through the one or more ports; and one or more processors configured to execute code that causes the one more processors to:

apply artificial intelligence to the signals and the one or more video feeds to provide a pilot stress-related incident prediction; and notify the pilot if the incident prediction is above a threshold indicating a likelihood of an occurrence of a pilot stress-related incident.

8. The ground control system as claimed in claim 7, wherein the one or more sensors comprise one or more of heart rate monitors, galvanic skin sensors, and EEGs.

9. The ground control system as claimed in claim 7, wherein the one or more sensors are configured to reside on one or more of a wrist, ear, and hand of the pilot.

10. The ground control system as claimed in claim 7, wherein the one or more cameras include additional cameras on one or more of the ground control system and near eyes of the pilot.

11. The ground control system as claimed in claim 7, wherein the one or more processors are further configured to execute code to store at least one of the signals from the one or more sensors and the one or more video feeds.

12. The ground control system as claimed in claim 7, wherein the one or more processors are further configured to execute code that causes the one or more processors train the artificial intelligence.

13. The ground control system as claimed in claim 12, wherein the code that causes the one or more processors to train the artificial intelligence comprises code that causes the one or more processors to train the artificial intelligence on one or more dataset comprised of signals, video feeds, and results.

* * * * *